United States Patent

[11] 3,569,659

[72] Inventors David B. Benton
  Richard G. Newling; Malcolm D. Hannah,
  Cambridge, England
[21] Appl. No. 813,839
[22] Filed Apr. 7, 1969
[45] Patented Mar. 9, 1971
[32] Priority Apr. 10, 1968
[33] Great Britain
[31] 17287/68

[54] RESISTANCE WELDING
  12 Claims, 10 Drawing Figs.
[52] U.S. Cl. .................................................. 219/117,
  219/110
[51] Int. Cl. .................................................. B23k 9/10
[50] Field of Search .......................................... 219/108,
  110, 114, 86

[56] References Cited
  UNITED STATES PATENTS
2,851,584  9/1958  Sciaky .......................... 219/86
3,400,242  9/1968  Waller .......................... 219/110
3,404,252  10/1968  Michael ....................... 219/110

Primary Examiner—J. V. Truhe
Assistant Examiner—J. G. Smith
Attorney—Kemon, Palmer & Estabrook ABSTRACT: The progress of a resistance welding process is ascertained by reference to the expansion of the workpieces and to avoid the difficulty of accurately detecting the maximum expansion, in the region of which the expansion/time curve is flattened, a sensing device indicates when the expansion has a selected value between 60 percent and 90 percent of the maximum expansion which would result if the current were allowed to continue. The welding current is switched off at this time or a predetermined interval thereafter. Methods of increasing the size of the weld nugget are described, including reinitiating the flow of welding current after the workpieces have contracted to some extent, this further pulse of current being again terminated when the expansion reaches a selected value before the flattened portion of the expansion/time curve.

RESISTANCE WELDING

In resistance welding, two workpieces are squeezed between a pair of electrodes and a high current is passed to heat the workpieces at the interface. As a consequence the workpieces weld together. In such a process it is important that the welds shall be of a consistently high quality and the size of the weld nugget at the interface is a guide to quality. An unexpectedly undersize weld will be of too low strength. With stitch roll spot or seam welds, such undersize welds will mean insufficient overlap and a leaky joint. An oversize weld means that there has been too great a heat input and this means excessive deformation of the workpiece, or indentation of the workpiece due to the electrode pressure, and sometimes leads to the expulsion of weld metal. Welds from which metal has been expelled due to excessive heat input are known as splashed welds and these are of low strength.

Naturally, every attempt is made to hold constant the welding conditions during a series of resistance welds but in spite of this the welds vary in quality. The electrode pressure and the duration of the weld current can be closely controlled but the effective welding current varies with such factors as the surface condition of the workpieces and the "fit" of the electrodes against the outer workpiece surfaces, and also with variations of the power supply. Moreover, the heat generated by the welding current varies because the workpieces present a number of paths for current flowing through the electrodes and the individual resistances of these paths vary with, for example, the closeness and the number of neighboring welds, as well as the surface condition of the workpieces.

The electrode pressure, the weld current and the duration of the weld current have different optimum values for different materials and sheet thicknesses. Also, for each thickness of the materials to be welded, a specific electrode diameter is recommended and it is considered that a good weld results when the weld diameter is substantially equal to the electrode diameter.

Resistance welding is accompanied by expansion of the workpiece which leads to a movement of separation of the electrodes. Towards the end of the weld, this expansion is offset by the sinking of the electrode into the softened workpiece and when the current ceases, cooling of the workpieces causes the electrodes to move together again.

It has previously been proposed to use electrode displacement to provide an indication of weld quality or to exercise some control over the welding cycle. As an example, in one proposal the reversal of electrode movement as the electrodes begin to sink into the workpieces was used to provide a signal for terminating the flow of current. In other proposals the electrode displacement has been allowed to achieve its maximum value, and consequently to pass beyond the point of maximum displacement, and the magnitude of upward displacement of the electrodes has been used as a guide to the quality of the weld. Such methods did not satisfactorily indicate splashed welds, for which a normal upward electrode displacement may be reached early in the weld cycle, after which the splash occurs. To overcome this difficulty, in our own prior Specification No. 1,014,133 we have proposed a method of quality indication and automatic correction based on a measurement of the rate of separation of the electrodes in the initial portion of the weld cycle. This method satisfactorily indicates splashed welds as faulty and is highly desirable for any process in which the quality of the welds is of great importance.

However, there is still a need for a less sophisticated method of weld control, for processes in which it is not quite so important that the highest quality of resistance welds (in terms of size) should be obtained.

In resistance welding at present, it is reckoned that when the maximum electrode displacement has been achieved, the diameter of the weld nugget at the interface of the workpieces will be substantially equal to the electrode tip diameter (except in the case of splashed welds); weld nuggets of a diameter less than about 80 percent of the electrode tip diameter are considered to be undersize. Generally, it has been assumed that the upward displacement of the movable electrode is primarily due to the formation of the molten nugget at the workpiece interface and consequently that this molten nugget grows continuously for at least the major part of the upward displacement of the electrode. However, we have discovered that in fact the molten nugget is still very small after one-half of the maximum upward movement of the electrode has taken place and that nearly all the growth of the molten nugget takes place in the remaining half of the upward displacement, and especially in the final one third of this displacement. This is the period when the slope of the curve of electrode displacement against time is being reduced, that is to say the curve is flattening and becoming more parallel with the zero displacement line of such a graph, after which the slope becomes slightly negative as the electrode begins to sink into the workpiece. Because of this flattening, a slight error in the estimation of the maximum electrode movement, that is to say the point of reversal of electrode movement, can cause a much larger error along the time axis of the graph. As we have already pointed out, at this point in the weld a small change in duration of the weld corresponds to a large change in the diameter of the molten weld nugget. We have found that the diameter of the molten weld nugget is much more consistent if the welding current is terminated before substantial flattening of the upward displacement occurs, although this diameter is less than the maximum diameter obtainable in the conditions in which the weld was made.

According to the present invention therefore, a sensing device of the welding machine is preset to operate when the expansion of the workpieces during the passage of current reaches a value between 60 percent and 90 percent of a predetermined maximum expansion for the workpieces in the conditions in which the weld will be made, the weld is initiated, and the welding current is cut off by the sensing device either immediately following its operation or a predetermined time after its operation. It will be appreciated that this results in a weld which is small, for the size of the electrodes used, but which is very consistent over a wide range of combinations of current amplitude and time, and that this result is achieved without the need for a weld timer, other than a very simple timer to prevent excessively long weld durations in the rare cases when the current is much too low to form a good weld. We prefer to terminate the weld at about 80 percent of the maximum displacement, although little difference is noticeable in the weld reproducibility if the weld is terminated between 75 percent and 85 percent; the aim is to set the level low enough to terminate high current welds before they splash and to stop the weld before the displacement curve has flattened significantly, and high enough to achieve a reasonable weld size. However, the small size of the weld in relation to the electrode is not a severe problem since its actual size can be increased by using electrodes which are larger than those which would normally be used for the thickness of material being welded. This will be more fully explained later in the specification, and alternative methods of increasing the weld size will also be described.

In order that the invention may be better understood, some examples will now be described with reference to the accompanying drawings, in which.

Figure 1:
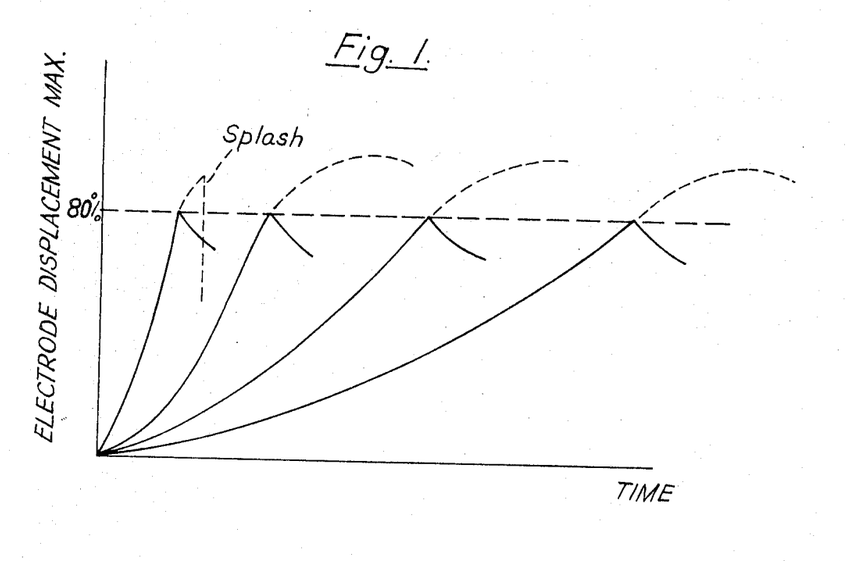
FIG. 1 illustrates electrode displacements for a number of different welding currents.

The welds shown in FIG. 1 were terminated at 80 percent of the maximum electrode displacement. Although these welds were made with different currents, the diameter of the molten weld nugget when 80 percent displacement was achieved was substantially the same for all the welds. As illustrated in FIG. 1, the weld on the extreme left-hand side of the diagram reached 80 percent of the maximum displacement in a very small time, indicating that the welding current was high. The dotted line represents the continuation of the electrode displacement if the welding cycle had not been terminated at 80 percent of the maximum displacement, and shows that this weld would have splashed, had it not been terminated at 80 percent of the maximum electrode displacement, and consequently would have been faulty.

Figure 2:
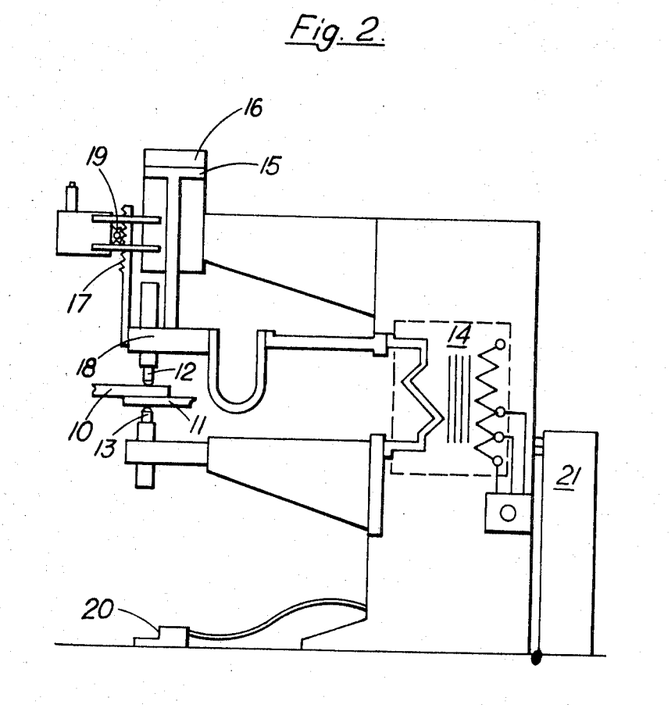
FIG. 2 illustrates apparatus for carrying the invention into effect.
Figure 3:
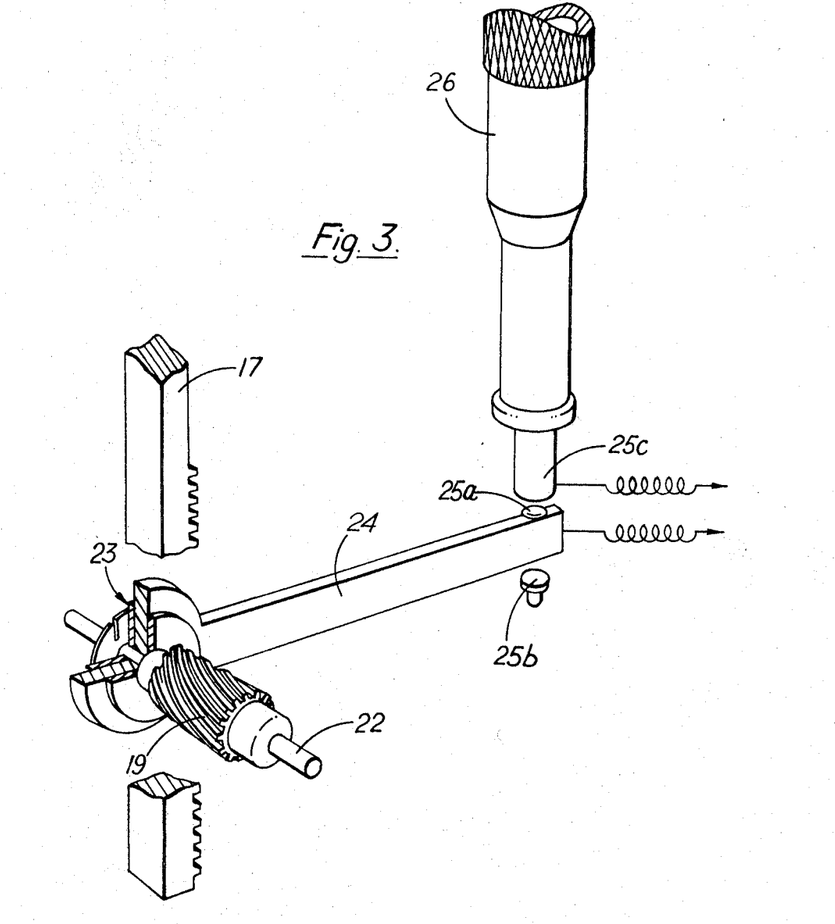
FIG. 3 shows details of the sensing device in the apparatus of FIG. 2.
Figure 4:
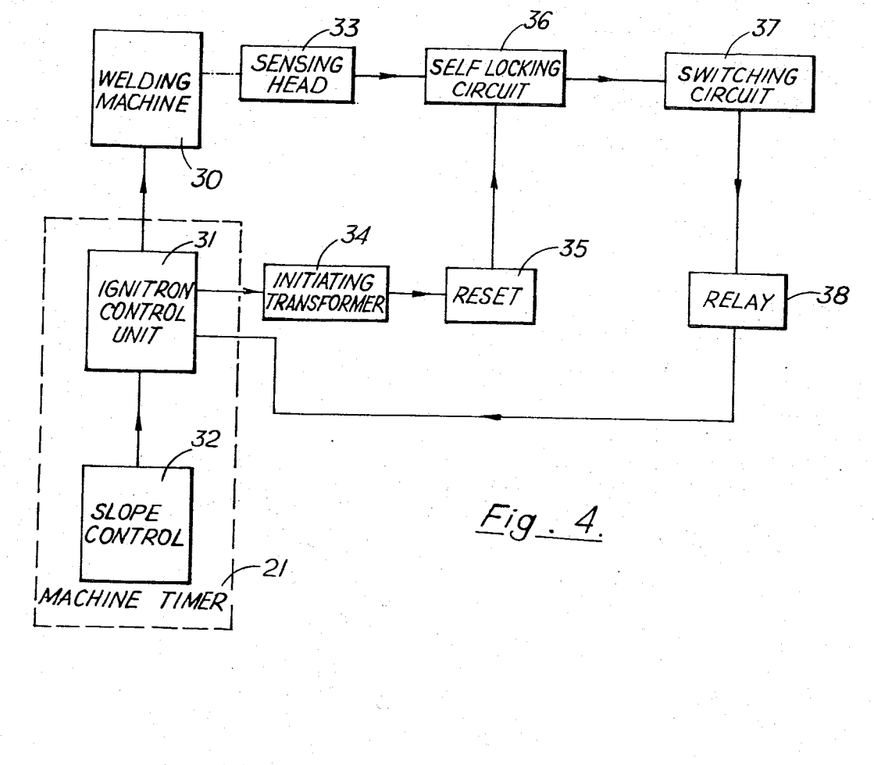
FIG. 4 is a block diagram of the welding cycle control circuit.

Apparatus for carrying into effect the method according to the invention are illustrated in FIGS. 2, 3 and 4 of the accompanying drawings. In FIG. 2, two superimposed workpieces 10 and 11 are held under pressure between two electrodes 12 and 13 connected to the terminals of the secondary winding of a welding transformer 14. The electrode 12 is movable and the pressure on this electrode is controlled by a piston 15 operating in an air cylinder 16. A foot-switch 20 initiates the welding operations and a timer and power control unit 21 sets a maximum limit for the duration of the weld. The timer in the unit 21 may be that found on conventional machines. In the present example, it is used only to switch off the machine if the current is so low that a good weld cannot possibly result; for example, after a weld period longer than the maximum expected weld time.

The movement of the upper electrode during a weld is sensed by a device including a rack 17 (see also FIG. 3), mechanically connected to an arm 18 carrying the upper electrode 12, and a pinion 19 driven by the rack. The pinion 19 is mounted on a shaft 22 which transmits the rotary movement of the pinion through a clutch 23 to a lever 24. In the form shown, the clutch includes two friction pads bearing against an intermediate disc. The remote end of the lever 24 carries an electrical contact 25a and travels between two stops 25b and 25c, the latter being mounted at the end of a micrometer 26. A gap corresponding to the predetermined electrode movement G is set between contact 25c and contact 25a when lever 24 rests on stop 25b which is the condition at the beginning of the weld. As expansion takes place the movement of the electrode causes angular movement of the place 24 as a result of which contact 25a and, when the electrode movement G has taken place, contact 25a abuts against stop 25c. The latter stop is also an electrical contact and connections extend from this and the lever 24 to the cycle duration control circuit. Any further expansion merely causes slipping of the clutch. The clutch is reset when the electrode is lowered into its operative position for the next weld.

FIG. 4 shows the apparatus with its control circuits in block form. The welding machine 30 and the ignitron control unit 31 are conventional and the slope control 32 is generally of the kind which has already been used in resistance welding machines, although in the present case the rate of slope is much smaller than has been used before. The sensing head 33 is of the kind illustrated in FIG. 3. To start a weld, the ignitron control unit is switched on to supply welding power to the welding machine and at the same time it applies a signal to an initiating transformer 34 which starts a timer in a resetting circuit 35. This reset timer is simply to ensure that all units are reset at the end of a period longer than the maximum expected period for any weld. The weld continues until closure of the contacts of the sensing head, which have been preset to a separation corresponding to a displacement of 80 percent of the maximum. The closure of the contacts operates a self-locking circuit 36 which may, for example, include a self-latching relay or may include a self-locking solid state circuit of the known kind employing two interconnected NOR gates. The self-locking circuit acts through a switching circuit 37 to energize a relay 38 which applies to the ignitron control unit a signal to cutoff the welding power.

Thus, before a weld is started the maximum displacement is ascertained, by trial or by taking into account the workpiece thickness, the current, the pressure and electrode tips diameter and the gap in the sensing head is then set to correspond to a displacement of 80 percent of the ascertained maximum.

The sensing head need not be of the form shown in the diagram. As an example, a signal can be derived from a solenoid having a plunger which moves in and out of the solenoid as the electrodes move away or towards one another, such as linear inductance transducer.

It is not essential to measure an upward displacement of an element of a sensing head in order to determine the expansion of the workpieces in this direction. As an example, a predetermined expansion of the workpieces could be detected by measuring strain. The strain could be measured in a strain sensing device added to the machine and sensitive to the workpiece expansion. Alternatively, if the "movable" electrode is able to move but not with complete freedom, so that the relative movement of the head and the machine frame is less than it would be if there were complete freedom of movement, the expansion is directly registered as strain in the machine frame.

Similarly the fraction clutch may be replaced by other forms of clutch, for example magnetically or electrostatically energized clutches.

Figure 5:
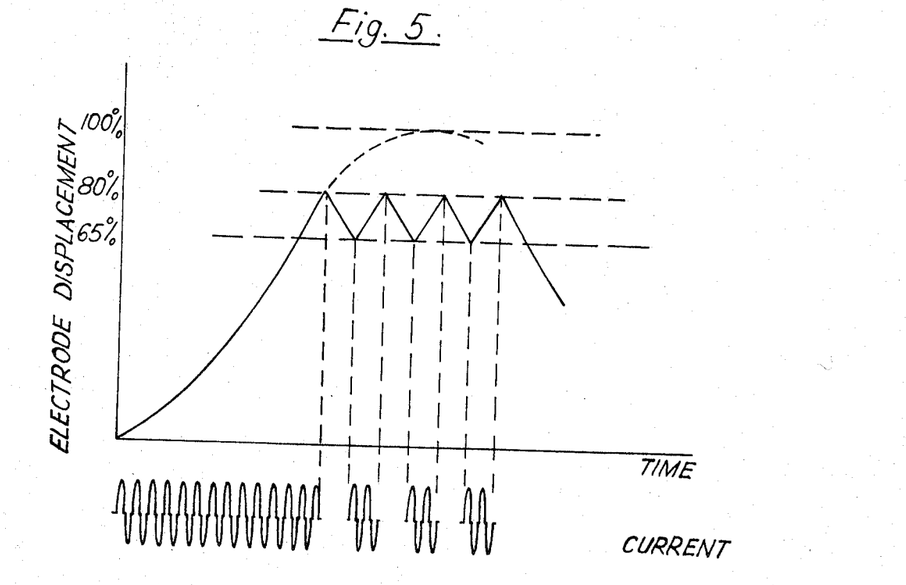
FIG. 5 is a curve of electrode displacement obtained by a modification of the method of FIG. 1.

One method of increasing the size of the nugget obtained while retaining the feature of sensing a predetermined value of expansion which is reached before the flattened portion of the expansion curve (see dotted extensions in FIG. 1) is illustrated in FIG. 5, which is again a graph of electrode displacement against time and also contains the welding current waveform. As in FIG. 1, the welding current is cut off when the required proportion of the maximum electrode displacement is reached (in this case 80 percent, the maximum displacement being illustrated by the maximum, value of the dotted continuation of the curve. In FIG. 5, however, the welding current is switched on again when the weld area of the workpieces has contracted to such an extent that the electrode displacement has been reduced to 65 percent of the maximum value. Further expansion then takes place and when the electrode displacement again reaches the 80 percent value the current is again switched off. This cycle is repeated, in the present example, until there have been three such minor bursts of current following the initial current period. Each minor burst of current serves to increase the size of the weld nugget without causing the electrode displacement to react the flattened portion of its curve. This method is particularly useful in welding thicker sheets and when using long weld times and for example for welding sheets having a thickness of one-fourth inches with a total weld duration of 2 to 4 seconds. The number of pulses can be determined in advance and selected by means of a switch on the additional control apparatus.

Figure 6:
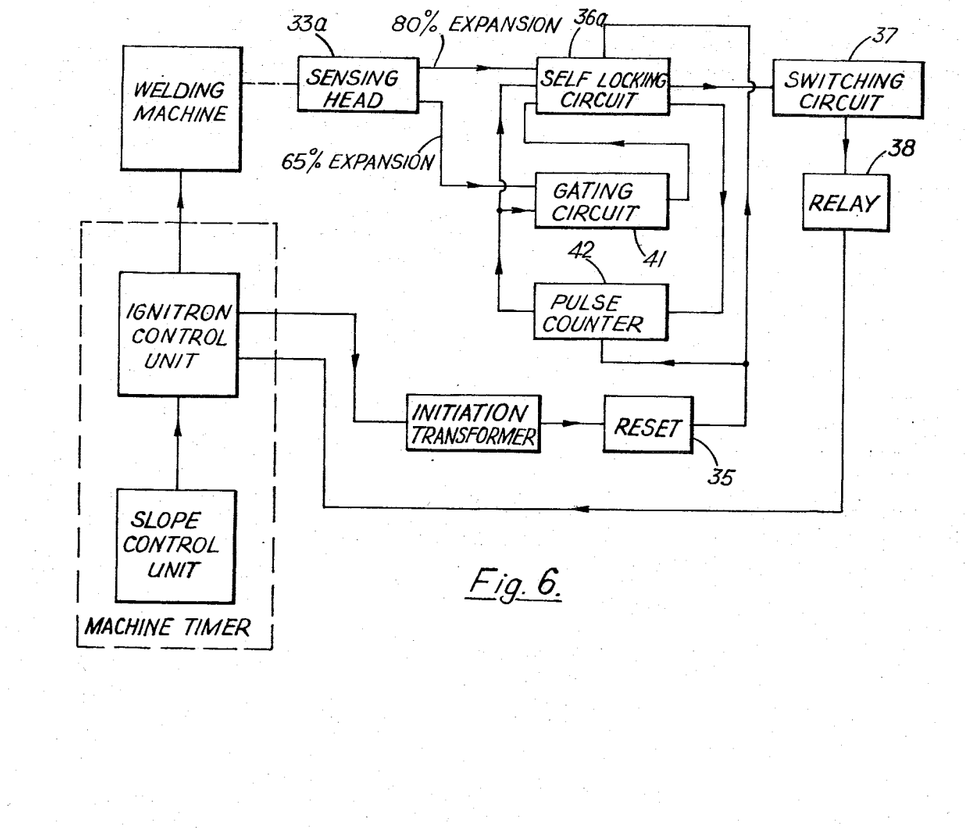
FIG. 6 and 7 show a modified circuit and a modified sensing head for carrying out the method of FIG. 5.
Figure 7:
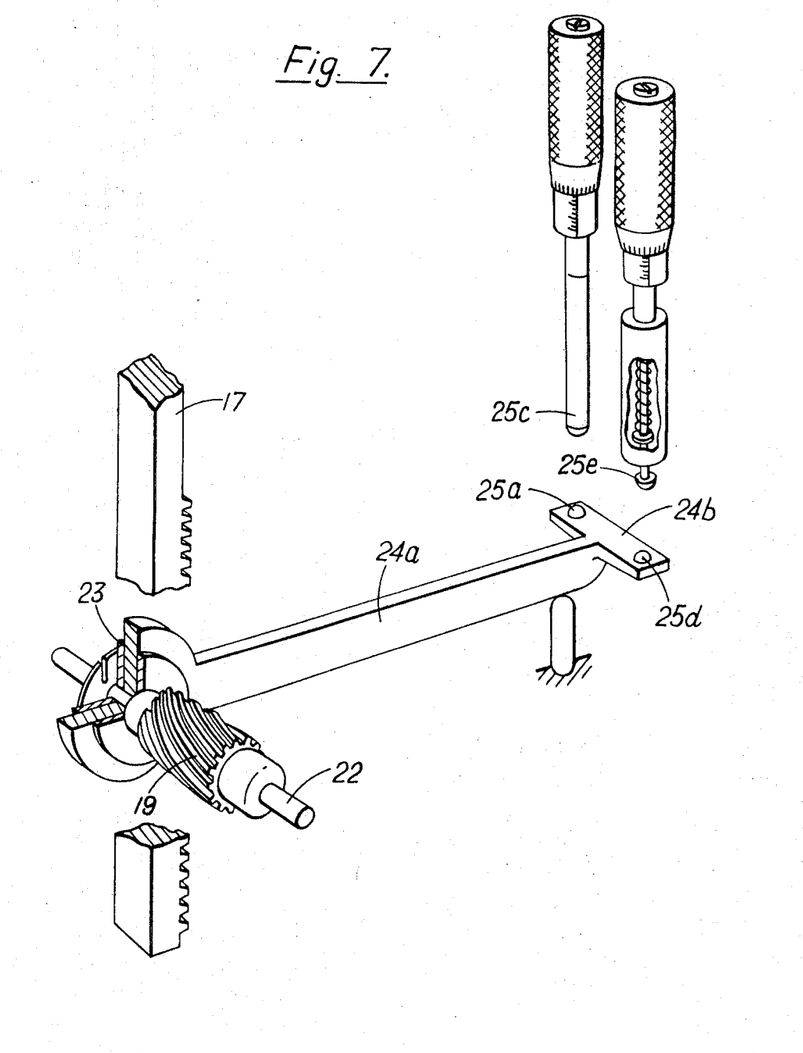

FIG. 6 is a modified circuit diagram to permit this recycling operation. The sensing head 33a now has two output leads, one representing an expansion of 80 percent and the other representing an expansion of 65 percent of the predetermined maximum expansion. The form of the sensing head is shown diagrammatically in FIG. 7, where it will be seen that the lever 24a now has at one end a crossbar 24b carrying two contacts 25a and 25d. The space between the contacts 25a and 25c is preset, as in the case of FIG. 3, to the predetermined proportion of the maximum displacement (for example to 80 percent of the maximum displacement) and the function of these contacts is the same as that of the corresponding contacts in FIG. 3. The contact 25d cooperates with a contact 25e which is spring-mounted on its micrometer. The gap between contacts 25e and 25d is preset to a value of 65 percent of the maximum expansion. When during the weld the expansion reaches 65 percent, the contact 25d makes electrical connection with contact 25e but this has no effect on the control circuit. The welding current continues and contact 25e rises against the spring force. At an expansion of 80 percent, the electrical connection between contact 25a and 25c results in a signal from the 80 percent output terminal of the sensing head which operates through the self-locking circuit and the switching circuit 37 to energize the relay 38 and thereby to switch off the welding current, as in the case of FIG. 5. As a result of the subsequent contraction and possible sinking of the electrodes into the workpieces, the electrodes now move towards one another, contact 25e following contact 25d until the expansion is reduced to the 65 percent value. The electrical connection between contact 25e and 25d is then broken and the resulting signal from the 65 percent output terminal of the sensing head acts through a gating circuit 41 to reset the self-locking circuit 36a. Switching circuit 37 then operates through the relay 38 to switch on the welding current for a further current pulse. With each pulse of the welding current a signal is applied from the self-locking circuit 36a to a pulse counter 42 which has been preset to the required number of welding current pulses. When this number is reached, the pulse counter applies a stop signal to the gating circuit 41 and the self-locking circuit 36a to prevent further operation. As before, the reset circuit 35 ensures that all units are reset at the end of a period longer than the maximum expected period for any weld.

In an alternative form, instead of having a predetermined number of welding current pulses, an overall heating time is preset on the machine and the number of welding current pulses occurring within this preset time depends upon the rate of expansion. Thus, the overall time may be set so that with a normal current amplitude there will be one major current pulse and two minor current pulses within this time. If the heating produced by the welding current is less than normal, then the entire preset period may be required for the expansion to the 80 percent value determined by the sensing head. Conversely, if the heating produced by welding current is higher than normal, the first current pulse terminates earlier than for the normal current and there is a greater number of subsequent current pulses before the preset time elapses. Consequently, the welding current is switched off (and the workpieces are cooling) for a larger proportion of the preset time. In this case, the pulse counter 42 of FIG. 6 is replaced by a timer.

Figure 8:
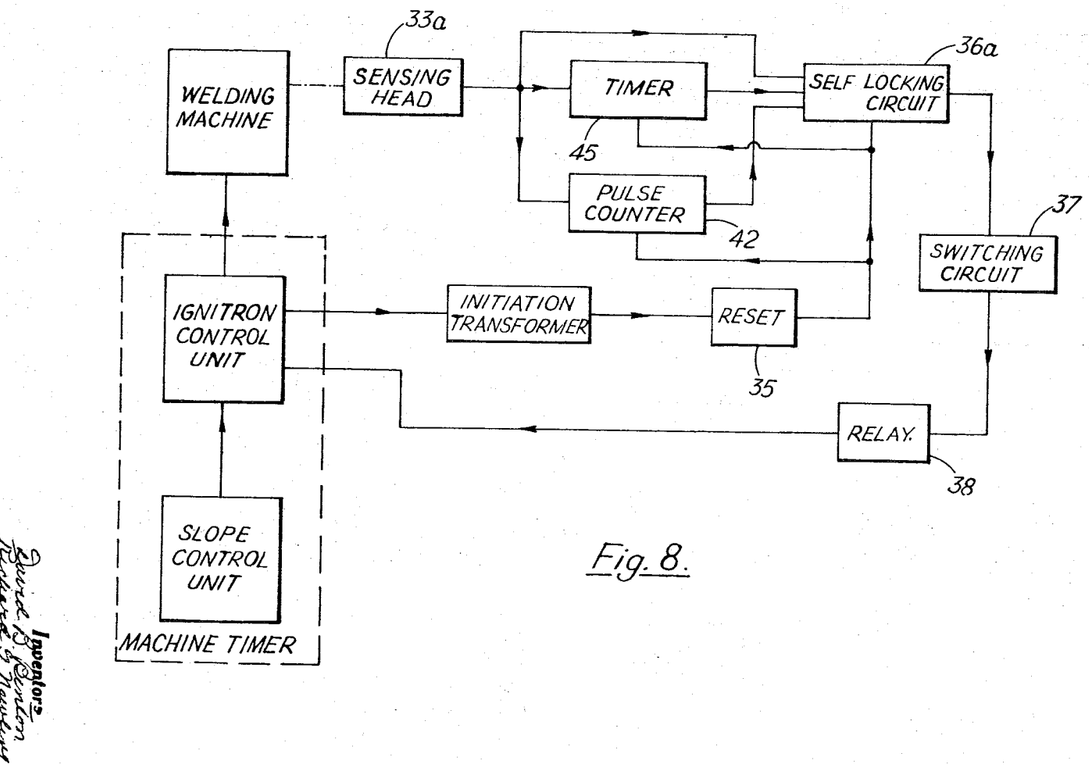
FIGS. 8 and 9 show further modifications of the circuit of FIG. 5.

A further possiblity is to maintain the current switched off for a predetermined time after each current pulse but to allow each current pulse to continue until the expansion has once again reached the 80 percent level. In a variation of this method, the sensing head is used to initiate current pulses which result in predetermined expansion increments after the initial 80 percent expansion, the cooling periods again being of fixed duration. Thus, in one method the driving clutch is deenergized when the current is switched off and is reenergized when the current is switched on again. The total contraction of the electrode separation while the current is off, due to cooling of the workpieces and sinking of the electrodes into the workpieces, may be much more than the 15 percent envisaged in FIGS. 6 and 7. However, the lever arm 24a of the sensing head cannot move back beyond its lower stop and consequently when the current is switched on again it will continue for a period sufficient to cause movement of the contact 25a through the preset distance to the contact 25c, that is to say through a distance corresponding to an expansion of 15 percent of the maximum expansion, this expansion being an addition to that which remained following the contraction period. If desired, the sprung contact in the arrangement of FIG. 7 can be used to set the lever arm back to the lower stop. A circuit for carrying this method into effect is shown in FIG. 8. In this FIG., a timer 45 commences its timing period each time that the current is switched off and switches the current on again at the end of the timed period. As before, a pulse counter 42 resets the self-locking circuit 36a after a predetermined number of minor current pulses to prevent further operation of this circuit to switch the current on again.

Figure 9:
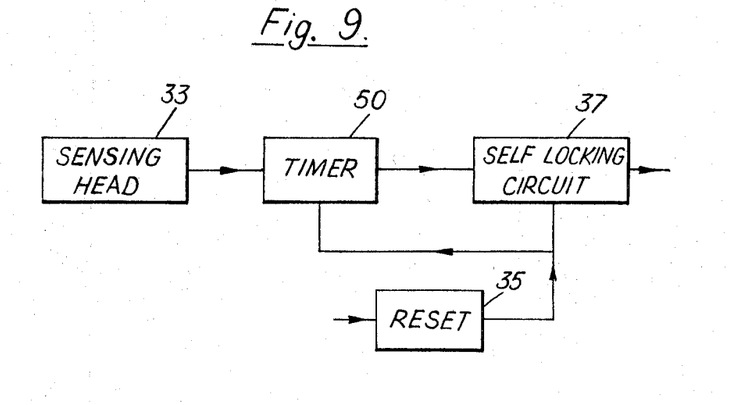

Another method of increasing the size of the nugget is to allow the welding current to continue for a predetermined period after the sensing of the predetermined expansion, which in this case may be less than 80 percent. As an example, the welding current may continue for one cycle at the mains supply frequency after the 80 percent expansion has been detected. In some cases it may be desirable to preset the detection level at a value lower than 80 percent and to continue the current for a longer period after the detection. All that is necessary is to modify the circuit of FIg 4 by the addition of a timer 50, as shown in FIG. 9.

In some conditions, the current passing through the area to be welded may be so low that the predetermined displacement might not be reached, or might be reached after a long period without the formation of a molten nugget. This is because for such situations the heat losses become as large as the heat input to the weld, the surrounding sheet material and electrodes constituting a very effective heat sink. To overcome this difficulty, an indicator can be provided for indicating a faulty weld if the weld extends for more than a predetermined period of time. However, a better method is to arrange for the welding current to increase at a predetermined rate, either from the commencement of the weld or at some predetermined instant after the commencement so that the increasing heat input due to the rising current overcomes the heat sink effect and ensures the continuation of nugget growth. For example, it could be arranged that the current increased steadily to a value 30 percent above the initial value in the course of 25 cycles of the supply if a weld cycle of this length is required. Alternatively, the current could increase from zero, for example along an exponential curve. The increasing current can be obtained by means of the slope control unit 32, shown in FIGS. 4, 6 and 8. Such a unit is known in resistance welding machines, although in the past the slope of the current curve has been considerably more than that suggested above.

If desired, this gradually increasing current may commence at the end of a predetermined timed period if the preset displacement (for example 80 percent of the maximum displacement) has not been reached within this timed period, indicating that the welding current is much too low. Alternatively, at the end of this timed period the welding current may jump from its normal value to a higher steady value. In a further possibility, instead of increasing the amplitude of the current, the "phase angle" of the current is modified to give full conduction in each half cycle. These possibilities are regarded as emergency procedures to save what would otherwise be a rejected weld. Other current profiles can be used, depending on the characteristics of the nugget growth in the workpieces in which the weld will be made.

In another form of the invention, the load applied to the electrodes is varied during the weld cycle. As an example, a high initial pressure may be exerted on the workpieces to ensure a good "fit" between them and consequently to render more uniform the initial current in different welds; then during the weld the pressure may be reduced to facilitate the growth of the nugget.

Figure 10:
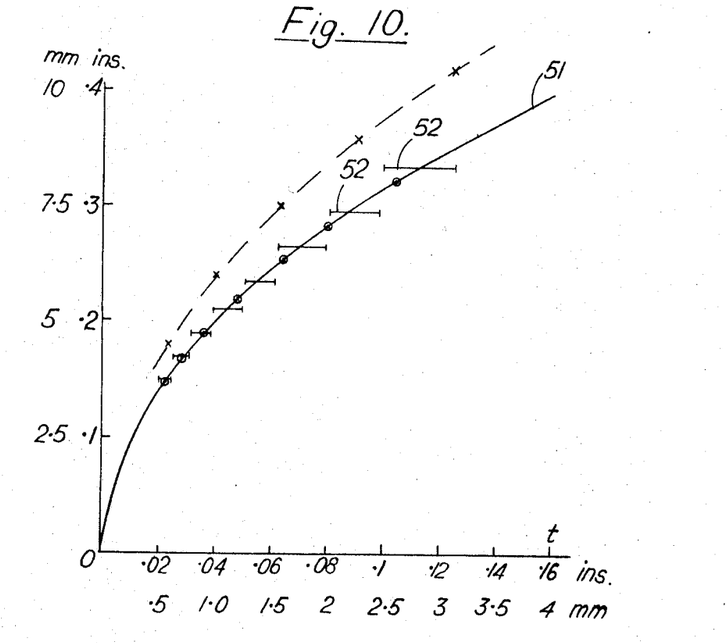
FIG. 10 is a graph illustrating the selection of electrode tip diameter for given workpieces.

Finally, as indicated above, the nugget size can be increased by using electrodes which have a tip diameter greater than that normally used for the thickness of material which is being welded. For any thickness $t$ of material, the electrode tip diameter $D$ can be ascertained from standard tables or from a formula. A simple formula which is widely used is $D = \sqrt{t}$ ins. or $D = 5\sqrt{t}$ mm. FIG. 10 is a graph showing by the full-line curve 51 this relationship between electrode tip diameter and thickness. The horizontal lines 52 represent the tip diameters recommended for different ranges of sheet thickness in Document No. III–282–66, prepared by the International Institute of Welding. This document also recommends that electrodes should have their tips reformed if it is found that the tip diameter exceeds the recommended value by 20 percent. To increase the size of the nuggets in methods employing the present invention, the electrodes can be more than 20 percent higher than the value given by the formula quoted above.

The methods and apparatus described above are relatively simple, because there is no closed-loop correction of the weld. Even where the weld continues for a number of current pulses, only a relatively simple timer or counter is required.

We claim:

1. A method of joining workpieces by resistance welding, including the step of: presetting a sensing device on a welding machine to operate during a weld when the expansion of the workpieces to be welded reaches a value between 60 percent and 90 percent of a predetermined maximum expansion for the workpieces; squeezing the workpieces between a pair of electrodes and passing a welding current between the electrodes; and switching off the welding current in response to operation of the sensing device.

2. A method in accordance with claim 1, in which the sensing device is preset to operate at an expansion between 70 percent and 90 percent of the said predetermined maximum expansion.

3. A method in accordance with claim 1, in which the sensing device is preset to operate when the expansion of the workpieces reaches a value between 75 percent and 85 percent of the predetermined maximum expansion.

4. A method in accordance with claim 1, further including the step of subsequently reinitiating the flow of welding current when the expansion of the workpieces has been reduced to a predetermined lower value, the welding current thus flowing for at least two pulses to make the weld and being terminated and reinitiated at predetermined higher and lower values of workpiece expansion, the weld being terminated when a predetermined number of current pulses have taken place.

5. A method in accordance with claim 1, further including the step of subsequently reinitiating the flow of welding current when the expansion of the workpieces has been reduced to a predetermined lower value, the current flow being terminated and reinitiated at the predetermined higher and lower values of workpiece expansion, and finally terminating the weld a predetermined time after the initiation of the first pulse of welding current.

6. A method in accordance with claim 1, further comprising the steps of timing a predetermined interval, following switching off the welding current and reinitiating at the end of the said interval, the welding current remaining on until the expansion of the workpieces reaches the said value once again.

7. A method in accordance with claim 1, further comprising the steps of timing a predetermined interval, following switching off the welding current and reinitiating at the end of the said interval, the welding current remaining on until the workpieces have expanded, from their condition at the beginning of the new welding current pulse, through a predetermined amount.

8. A method in accordance with claim 1, in which the welding current is switched off to terminate the weld a predetermined period after the operation of the sensing device.

9. A method in accordance with claim 1, in which the electrode tip diameter is at least $1.2\sqrt{t}$ ins. (that is to say $6\sqrt{t}$ mm.), where $t$ is the thickness of the workpieces.

10. A method in accordance with claim 1, in which the amplitude of the welding current increases progressively throughout the weld.

11. A method in accordance with claim 1, in which the amplitude of the welding current increases progressively if the weld cycle continues beyond a predetermined duration.

12. A method in accordance with claim 1, in which the amplitude of the welding current increases to a higher steady value if the weld has not terminated within a predetermined duration.

UNITED STATES PATENT OFFICE
CERTIFICATE OF CORRECTION

Patent No. 3,569,659      Dated   March 9, 1971

Inventor(s) David B. Benton, Richard G. Newling, Malcolm D. H

It is certified that error appears in the above-identified patent and that said Letters Patent are hereby corrected as shown below:

[73] Assignee   The Welding Institute
                Cambridge, England

Signed and sealed this 14th day of September 1971.

(SEAL)
Attest:

EDWARD M.FLETCHER,JR.          ROBERT GOTTSCHALK
Attesting Officer              Acting Commissioner of Pat